UNITED STATES PATENT OFFICE.

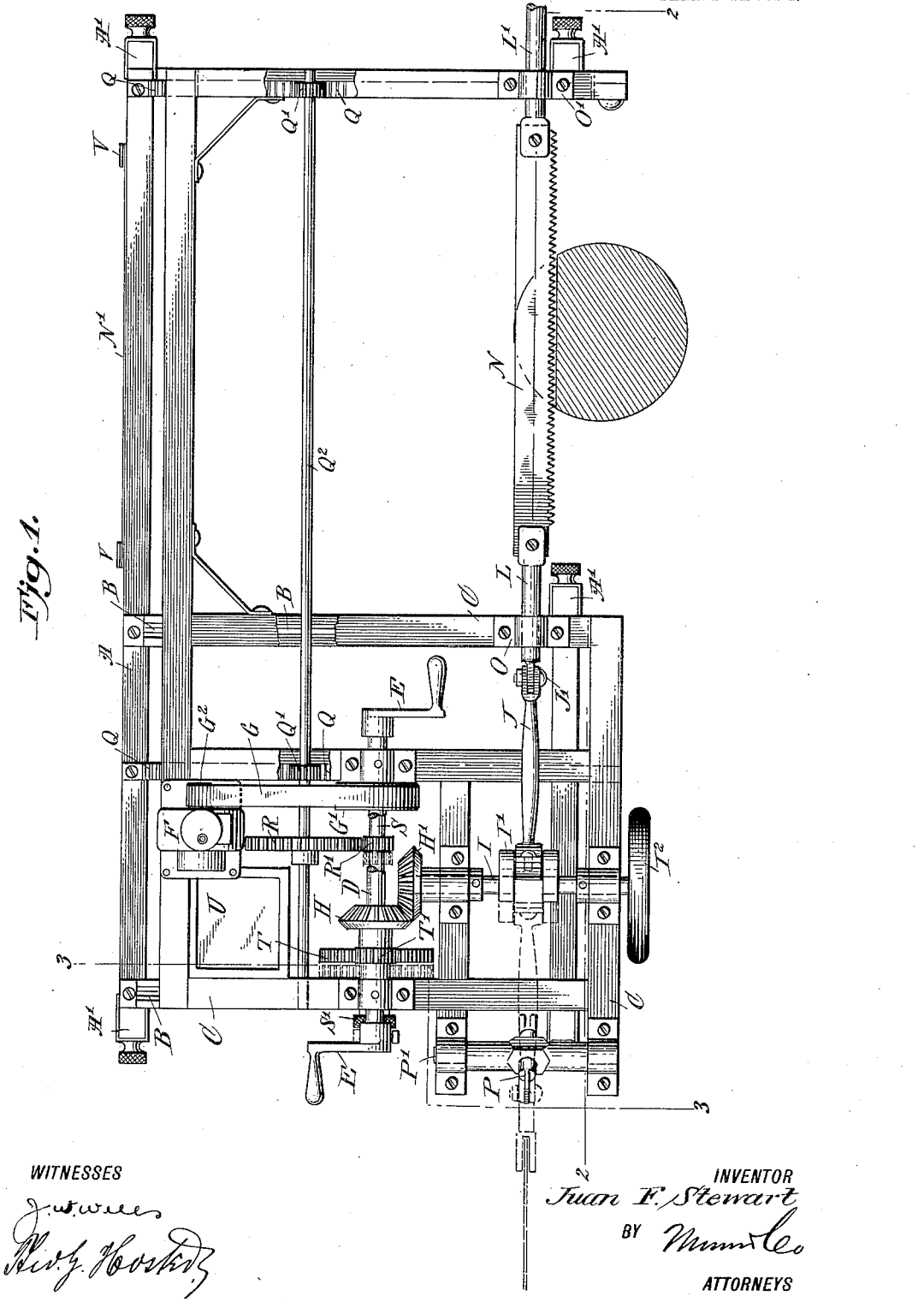

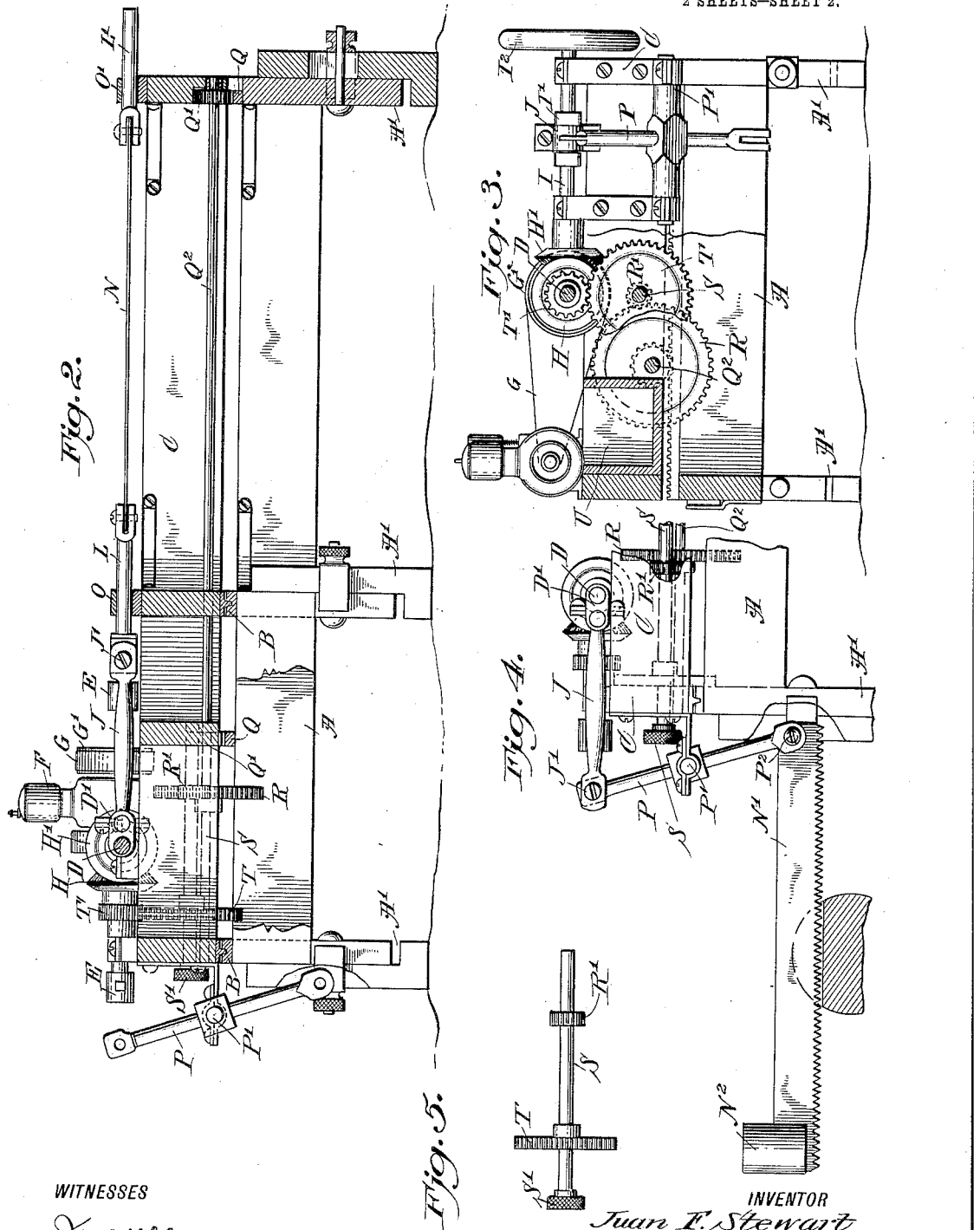

JUAN F. STEWART, OF WILMINGTON, DELAWARE.

SAWING-MACHINE.

1,097,480.    Specification of Letters Patent.    Patented May 19, 1914.

Application filed October 31, 1913. Serial No. 798,491.

*To all whom it may concern:*

Be it known that I, JUAN F. STEWART, a citizen of the United States, and a resident of Wilmington, in the county of New-castle and State of Delaware, have invented a new and Improved Sawing-Machine, of which the following is a full, clear, and exact description.

The object of the invention is to provide a new and improved sawing machine arranged for conveniently and quickly sawing trees with a view of felling the same, and to allow of sawing the felled tree or log into desired lengths for cordwood, lumber and other mill material.

In order to accomplish the desired result use is made of a frame on which is mounted to travel a carriage carrying a crank shaft connected by a pitman with either a horizontally disposed saw blade for sawing trees or with a vertically-disposed rock arm connected with a vertically-disposed saw blade for sawing a log into desired length. Use is also made of a feed device for feeding the carriage forward at the time the horizontally-disposed saw blade is used, the said feed device being actuated in unison with the crank shaft.

A practical embodiment of the invention is represented in the accompanying drawings forming a part of this specification, in which similar characters of reference indicate corresponding parts in all the views.

Figure 1 is a plan view of the sawing machine arranged for sawing a tree; Fig. 2 is a sectional side elevation of the same on the line 2—2 of Fig. 1; Fig. 3 is a transverse section of the same on the line 3—3 of Fig. 1; Fig. 4 is a side elevation of part of the sawing machine arranged for sawing a log into desired length, the fly wheel of the crank shaft being shown removed, part of the frame being shown broken out and the log being shown in section; and Fig. 5 is a side elevation of the intermediate shaft of the feed mechanism for the carriage.

The sawing machine is mounted on a main frame A provided with adjustable legs A' to permit of supporting the main frame A in a horizontal or a slightly inclined position on even or uneven ground and during the time a tree is to be sawed. The top of the frame A is provided with transversely-extending guideways B on which is mounted to travel a carriage C. A longitudinally-extending main or driving shaft D is journaled on the carriage C and is provided at its ends with crank arms E to permit of turning the main shaft D by hand. On the carriage C is mounted a motor or engine F connected by a belt G with pulleys G' and G² with the main shaft D to rotate the latter by power whenever it is desired to do so. On the main shaft D is secured a bevel gear wheel H in mesh with a bevel gear wheel H' secured on the rear end of a transversely-extending crank shaft journaled in suitable bearings arranged on the carriage C. The crank shaft I is provided with a crank I' pivotally connected with one end of a pitman J connected at its other end by a bolt J' with the member L of a saw support for a horizontally-disposed saw blade N employed for sawing a tree with a view of felling the same, as indicated in Fig. 1. The member L of the saw support is attached to one end of the saw blade N while another member L' of the said saw support is secured to the other end of the said saw blade, and the two members L and L' are arranged in longitudinal alinement and mounted to slide in suitable bearings O, O' attached to the carriage C. The forward end of the crank shaft I is provided with a suitable fly wheel I². It will be noticed that when the crank shaft I is turned by hand or by power then a reciprocating motion is given to the saw blade N to saw the tree on feeding the carriage C forward as hereinafter more fully explained.

When it is desired to saw the felled tree or log into desired length then the following arrangement is made: The bolt J' connecting the pitman J with the member L of the saw support is removed to disconnect the pitman J from the said member L and then the pitman J is swung over to the left and is connected by bolt J' with the upper end of a rock arm P fulcrumed at P' on the left-hand side of the carriage C. The lower end of the rock arm P is connected by a bolt P² with one end of a vertically-disposed saw blade N' for sawing a tree or log into desired length, the outer end of the said saw blade N' being provided with a suitable weight N² to feed the saw blade N' downward during the time a reciprocating motion is given to the saw from the crank shaft I by the mechanism just described. It is understood that during the sawing of the tree or log into desired length by the saw blade N' the carriage C is held at a standstill, that is, no feeding movement is given to the same.

The feed mechanism for feeding the carriage C forward or backward during the time the saw blade N is in use for felling a tree is arranged as follows: The main frame A is provided with transversely-extending racks Q engaged by pinions Q' secured on a longitudinally-extending shaft Q² journaled in suitable bearings arranged on the carriage C. On the shaft Q² is secured a gear wheel R in mesh with a pinion R' fastened to a shaft S extending longitudinally and mounted to turn and to slide in the direction of its axis in suitable bearings arranged on the carriage C. On the shaft S is secured a gear wheel T in mesh with a pinion T' secured on the main shaft D so that when the latter is rotated a rotary motion is transmitted by the gearing just described to the shaft Q² which by the pinions Q' in mesh with the racks Q causes the carriage C to travel forward or backward according to the direction in which the main shaft D is turned at the time. One outer end of the shaft S is provided with a knob or handle S' adapted to be taken hold of by the operator for shifting the shaft S in the direction of its axis with a view to move the pinion R' out of engagement with the gear wheel R and to move the gear wheel T out of engagement with the pinion T' whenever it is desired to stop the feeding of the carriage C. As previously mentioned, the feed mechanism just described is only used at the time the saw blade N is in action for felling a tree and during this time the pinion R' is in mesh with the gear wheel R and the gear wheel T is in mesh with the pinion T', but when the saw blade N' is used for sawing the felled tree or log into desired length then the shaft S is shifted to the left to move the pinion R' out of engagement with the gear wheel R and to move the gear wheel T out of mesh with the pinion T' so that the carriage C remains at a standstill during the sawing of the tree or log into desired length.

The carriage C is provided with a suitable box U for containing various tools such as wedges, hammers and the like used in felling trees or sawing logs into desired length.

It is understood that the rock arm P, the pitman J and the members L, L' of the saw support for the saw blade N are arranged in the same vertical plane, and the saw support L and the rock arm P are disposed on opposite sides of the crank shaft I to permit of conveniently and properly connecting the pitman J with either the member L or the upper end of the vertically-disposed rock arm P. The saw blade N' when not in use is carried on suitable supports V on the rear of the main frame A (see Fig. 1).

The sawing machine shown and described is comparatively simple and durable in construction and it can be used to saw a tree and to saw a felled tree or a log into desired lengths. It will be noticed that in practice it requires moving the sawing machine but a short distance from the original position at the tree when felling the same to the felled tree to saw the latter into desired lengths. By the arrangement described double handling of the log or felled tree is dispensed with and the cut-up lengths can be easily handled in loading and unloading.

Having thus described my invention, I claim as new and desire to secure by Letters Patent:

1. A sawing machine, comprising a carriage, a crank shaft journaled on the said carriage, a pitman connected with the crank of the said crank shaft, a horizontally-disposed saw holder slidable on the said carriage and adapted to carry a horizontal saw blade, and a vertically-disposed rock arm fulcrumed on the said carriage and provided at one end with attaching means for connection with a vertical saw blade, the said holder and the said rock arm being located on opposite sides of the crank shaft and extending in a vertical plane passing through the said pitman, and means for removably connecting the outer end of the said pitman with either the said saw holder or the said rock arm.

2. A sawing machine, comprising a main frame provided with transverse guideways and transverse racks, a carriage mounted to travel on the said guideways, a main driving shaft journaled on the said carriage, a feed shaft journaled on the said carriage and provided with pinions in mesh with the said racks, an intermediate shaft mounted to turn and to slide in the said carriage, gear wheels connecting the said intermediate shaft with the said main driving shaft and the said feed shaft, a crank shaft journaled on the said carriage, a gearing connecting the said crank shaft with the said main driving shaft, a pitman connected with the crank of the said crank shaft, and a saw holder movably mounted on the said carriage and connected with the said pitman.

3. A sawing machine, comprising a main frame, a carriage mounted to travel transversely on the frame, a feed shaft mounted in the carriage and provided with a gear wheel, means for operating the carriage from the said shaft, a driven shaft provided with a pinion, an intermediate shaft mounted to slide and to turn and provided with a gear wheel and pinion adapted to mesh with the pinion and gear wheel of the driven and feed shafts, a crank shaft geared with the driven shaft, a pitman connected with the crank of the crank shaft, and a movable saw holder with which the pitman is connected.

4. A sawing machine comprising a frame, a carriage mounted to travel transversely on the frame, a driven shaft, means for operating the carriage from the said shaft, a crank shaft, gearing between the crank shaft and driven shaft, a pitman secured to the crank of the crank shaft, alined bearings on the carriage, and a saw blade having a member projecting from each end thereof, said members working in the bearings of the frame and to one of which the pitman is connected.

5. A sawing machine of the character described comprising a frame, a carriage mounted to travel on the frame, a driven shaft mounted on the carriage, means for operating the carriage from the driven shaft, means for disengaging the carriage operating means, a crank shaft geared with the driven shaft, movable saw holding members at opposite sides of the crank shaft, and a pitman connected with the crank shaft and adapted to be connected with either of the said saw holding members.

In testimony whereof I have signed my name to this specification in the presence of two subscribing witnesses.

JUAN F. STEWART.

Witnesses:
 FRANK C. STIDHAM,
 FRANK A. CAEL.